(12) United States Patent
Gonzalez et al.

(10) Patent No.: US 10,332,375 B1
(45) Date of Patent: Jun. 25, 2019

(54) TRACKING ASSEMBLY

(71) Applicants: Julio Gonzalez, Benson, NC (US); Johana Gonzalez, Benson, NC (US)

(72) Inventors: Julio Gonzalez, Benson, NC (US); Johana Gonzalez, Benson, NC (US)

(*) Notice: Subject to any disclaimer, the term of this patent is extended or adjusted under 35 U.S.C. 154(b) by 0 days.

(21) Appl. No.: 15/903,190

(22) Filed: Feb. 23, 2018

(51) Int. Cl.
*G08B 21/02* (2006.01)
*G04B 47/06* (2006.01)

(52) U.S. Cl.
CPC ........ *G08B 21/0211* (2013.01); *G04B 47/063* (2013.01); *G08B 21/0252* (2013.01); *G08B 21/0294* (2013.01); *G01S 2205/006* (2013.01)

(58) Field of Classification Search
CPC .................................................. G08B 21/0202
USPC ..................................................... 340/539.15
See application file for complete search history.

(56) References Cited

U.S. PATENT DOCUMENTS

| | | | |
|---|---|---|---|
| 5,841,352 A | 11/1998 | Prakash | |
| D440,170 S | 4/2001 | Conerly | |
| 7,259,671 B2 | 8/2007 | Ganley et al. | |
| 7,602,303 B2 | 10/2009 | Douglas et al. | |
| 9,013,314 B2* | 4/2015 | Golomb | G08B 21/0294 340/539.15 |
| 9,361,782 B2* | 6/2016 | Lin | G08B 13/1427 |
| 2005/0200487 A1 | 9/2005 | O'Donnell et al. | |
| 2008/0055072 A1* | 3/2008 | Holoyda | G08B 21/0202 340/539.13 |
| 2009/0040040 A1* | 2/2009 | Ben-Itzhak | G08B 13/1427 340/539.13 |
| 2015/0109126 A1 | 4/2015 | Crawford | |
| 2015/0201846 A1* | 7/2015 | Maiershon | A61B 5/0205 600/301 |
| 2016/0035205 A1* | 2/2016 | Messenger | A61B 5/746 340/539.15 |
| 2016/0063836 A1* | 3/2016 | Fishwick | G08B 21/0272 340/8.1 |
| 2016/0247378 A1* | 8/2016 | Baczuk | H04W 4/70 |

FOREIGN PATENT DOCUMENTS

WO      WO2005091927      10/2005

* cited by examiner

*Primary Examiner* — Eric Blount

(57) ABSTRACT

A tracking assembly includes an electronic device. A first tracking unit is provided and the first tracking unit is selectively worn on a first user. The first tracking device is in electrical communication with the electronic device. Moreover, the electronic device programs a predetermined trigger distance into the first tracking unit. A second tracking unit is provided and the second tracking unit is selectively worn on a second user. The second tracking unit is in electrical communication with the first tracking unit to determine a location of the second tracking unit with respect to the first tracking unit. In this way the second tracking unit facilitates the first user to track the second user. The first tracking unit generates an alert when the second tracking unit moves beyond the predetermined trigger distance with respect to the first tracking unit.

1 Claim, 4 Drawing Sheets

TRACKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to tracking devices and more particularly pertains to a new tracking device for tracking a second user with respect to a first user.

BRIEF SUMMARY OF THE INVENTION

An embodiment of the disclosure meets the needs presented above by generally comprising an electronic device. A first tracking unit is provided and the first tracking unit is selectively worn on a first user. The first tracking device is in electrical communication with the electronic device. Moreover, the electronic device programs a predetermined trigger distance into the first tracking unit. A second tracking unit is provided and the second tracking unit is selectively worn on a second user. The second tracking unit is in electrical communication with the first tracking unit to determine a location of the second tracking unit with respect to the first tracking unit. In this way the second tracking unit facilitates the first user to track the second user. The first tracking unit generates an alert when the second tracking unit moves beyond the predetermined trigger distance with respect to the first tracking unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
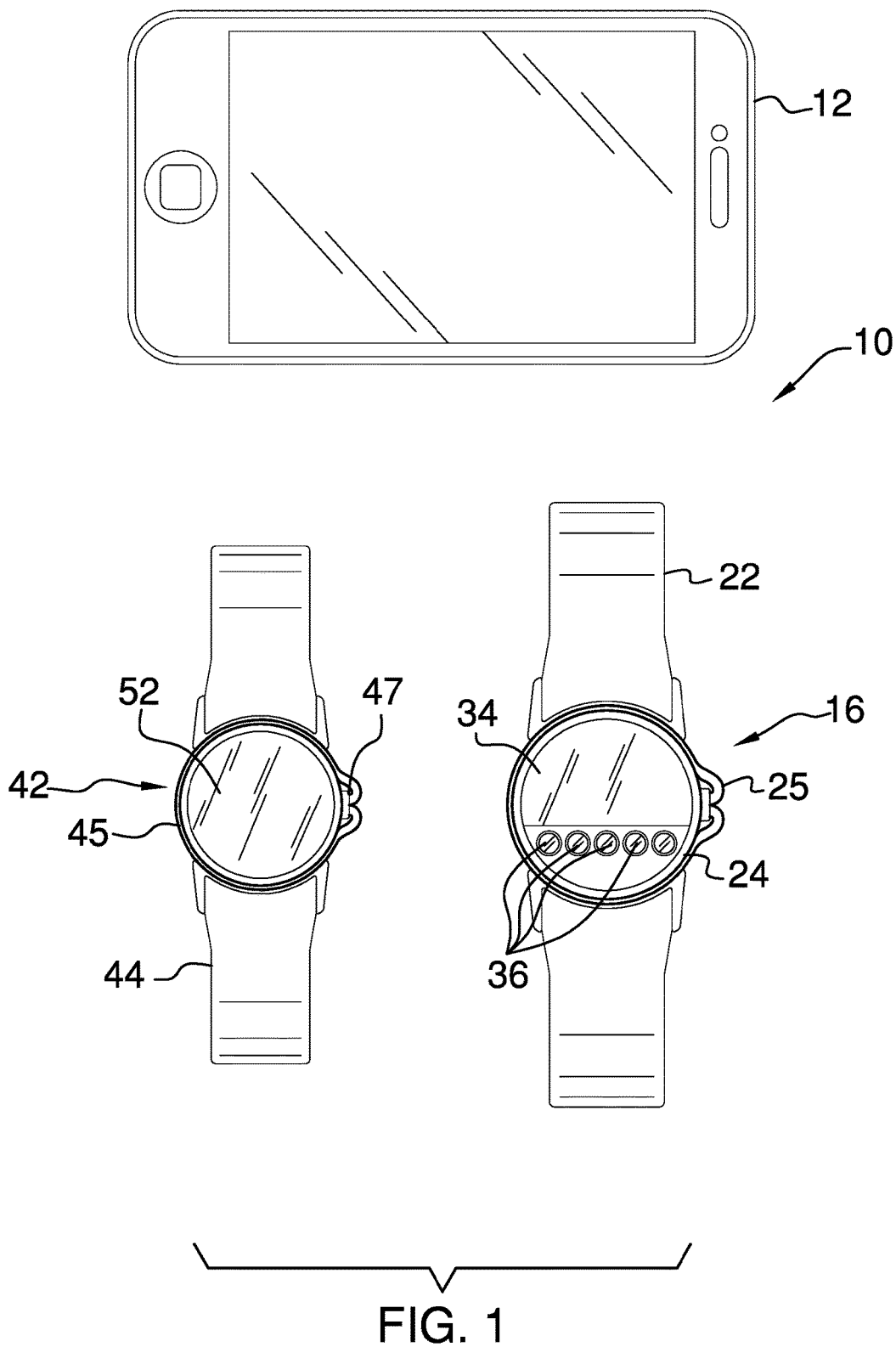
FIG. 1 is a top view of a tracking assembly according to an embodiment of the disclosure.
Figure 2:
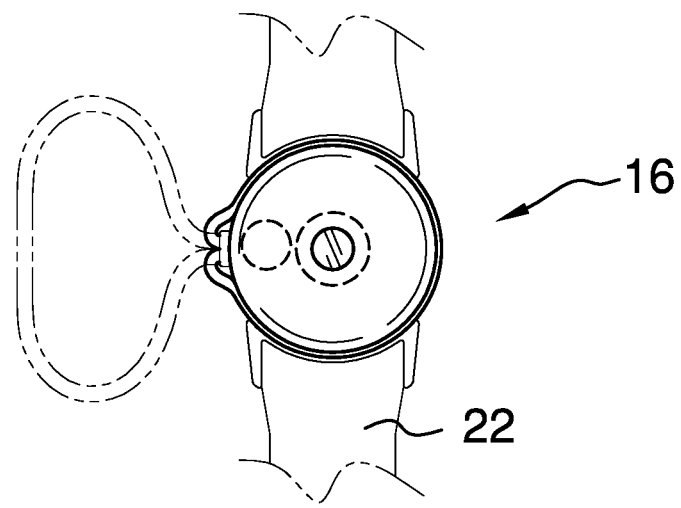
FIG. 2 is a bottom phantom view of first tracking unit of an embodiment of the disclosure.
Figure 3:
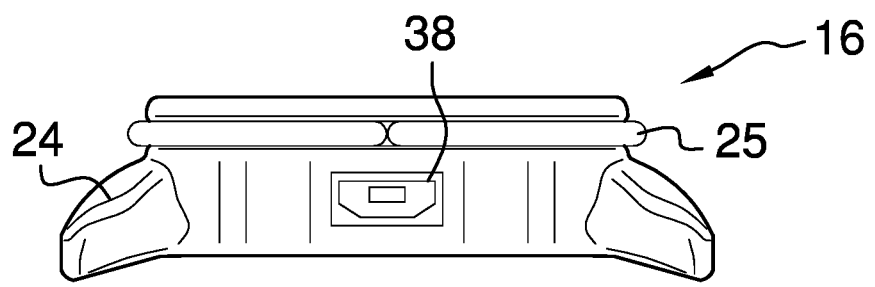
FIG. 3 is a front view of a first tracking unit of an embodiment of the disclosure.
Figure 4:
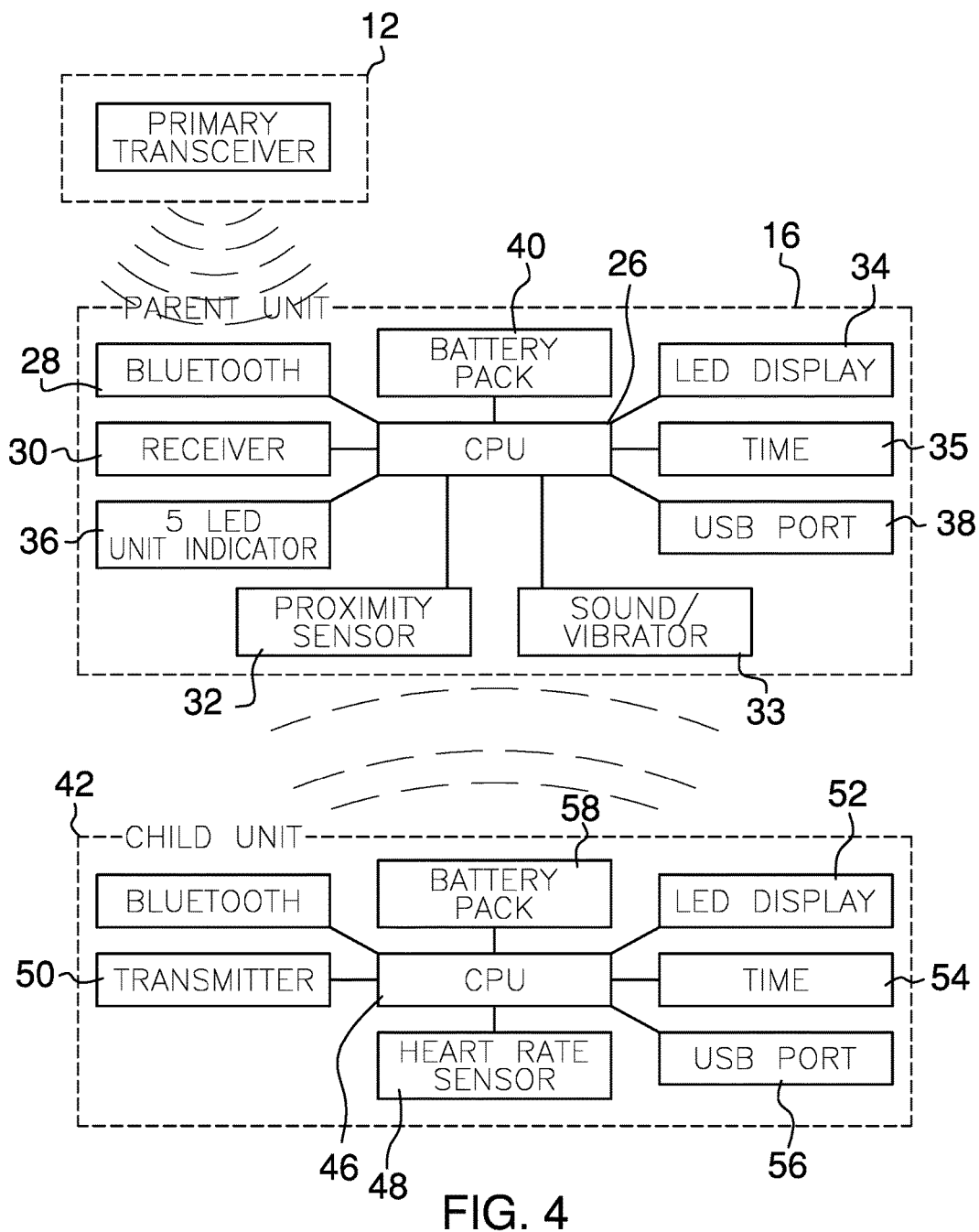
FIG. 4 is a schematic view of an embodiment of the disclosure.
Figure 5:
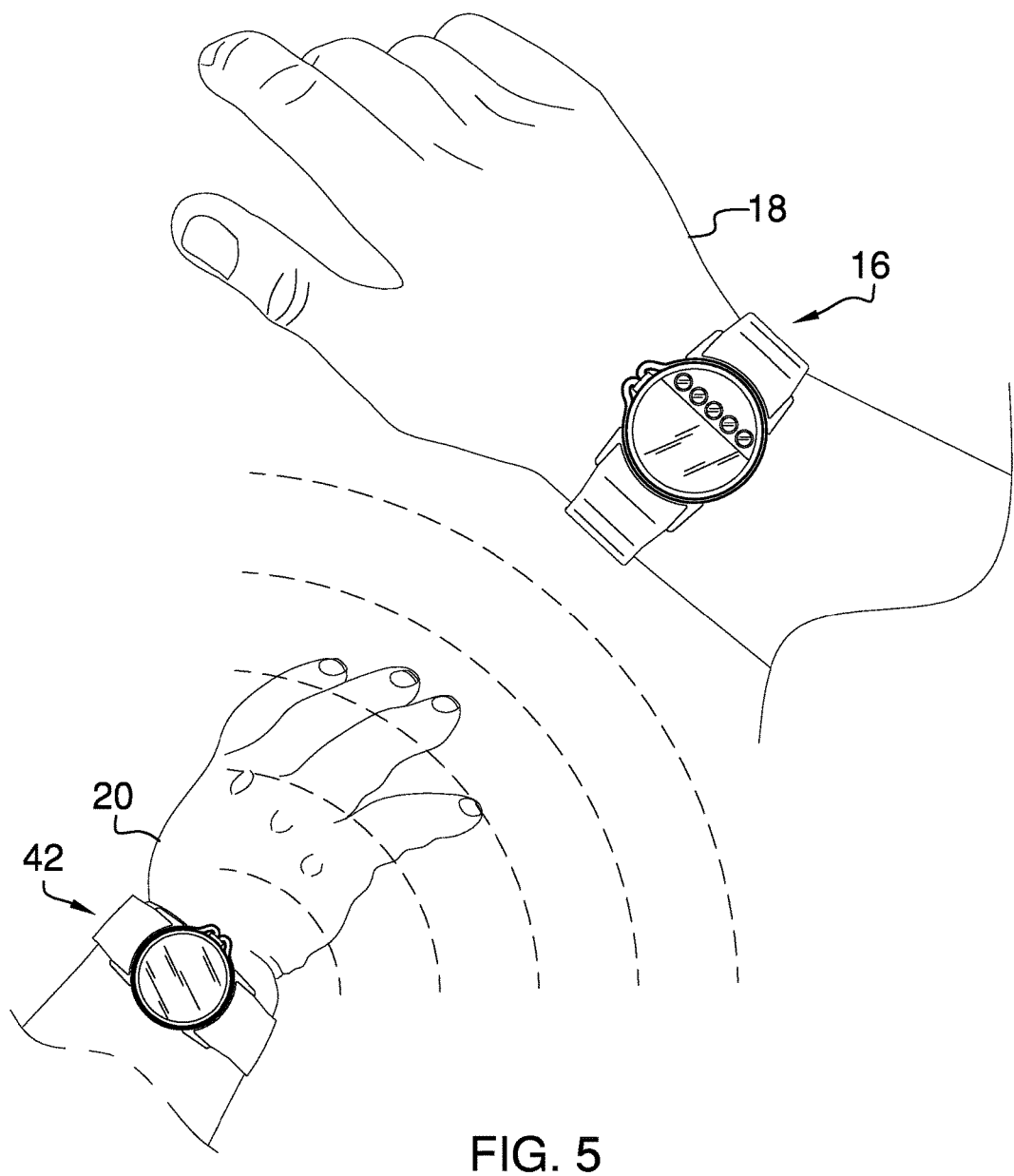
FIG. 5 is a perspective in-use view of an embodiment of the disclosure.

With reference now to the drawings, and in particular to FIGS. 1 through 5 thereof, a new tracking device embodying the principles and concepts of an embodiment of the disclosure and generally designated by the reference numeral 10 will be described.

As best illustrated in FIGS. 1 through 5, the tracking assembly 10 generally comprises an electronic device 12 that includes a primary transceiver 14. The electronic device 12 may be a smart phone or the like and the primary transceiver 14 may be a radio frequency transceiver or the like. Moreover, the primary transceiver 14 may employ a WPAN signal and Bluetooth communication protocols.

A first tracking unit 16 is provided and the first tracking unit 16 is selectively worn on or carried by a first user 18. The first user 18 may be a parent, a caregiver or other individual put in charge of keeping track of a second user 20. The first tracking unit 16 is in electrical communication with the electronic device 12 and the electronic device 12 programs a predetermined trigger distance into the first tracking unit 16. The predetermined trigger distance may be a selected distance ranging between approximately 15.0 meters and 90.0 meters. Additionally, the electronic device 12 may control all operational parameters of the first tracking unit 16.

The first tracking unit 16 comprises a first band 22 that is selectively worn on the first user 18 and a first housing 24 that is removably coupled to the first band 22. The first housing 24 may be a watch body or the like. A first elastic strap 25 is provided and the first elastic strap 25 is coupled to the first housing 24. The first elastic strap 25 may be coupled to an object when the first tracking unit is not being worn. The object may be the first user's 18 clothing or the like. A first processor 26 is positioned within the first housing 24 and the first processor 26 selectively generates an alarm sequence. The first processor 26 may be an electronic processor or the like.

A first transceiver 28 is positioned within the first housing 24 and the first transceiver 28 is electrically coupled to the first processor 26. The first transceiver 28 is in electrical communication with the primary transceiver 14 such that the first transceiver 28 receives the predetermined trigger distance from the primary transceiver 14. The first transceiver 28 may be a radio frequency transceiver or the like. Additionally, the first transceiver 28 may employ a WPAN signal and Bluetooth communication protocols.

A receiver 30 is positioned within the first housing 24 and the receiver 30 is electrically coupled to the first processor 26. The receiver 30 may be a radio frequency receiver 30 or the like. A signal analyzer 32 is positioned within the first housing 24 and the signal analyzer 32 is electrically coupled to the first processor 26. The signal analyzer 32 may be an electronic signal analyzer 32 capable of determining a signal strength of a transmitted signal.

An alarm 33 is positioned within the first housing 24 and the alarm 33 selectively communicates an alert to the first user 18. The alarm 33 is electrically coupled to the first processor 26 and the first processor 26 turns the alarm 33 on when the first processor 26 generates the alarm 33 sequence. The alarm 33 may include a speaker and a vibration unit. The speaker may emit an audible alarm 33 when the first processor 26 generates the alarm 33 sequence. Additionally, the vibration unit may frictionally engage the first housing 24 when the first processor 26 generates the alarm 33 sequence to facilitate haptic feedback to the first user 18.

A first display 34 is coupled to the first housing 24 and the first display 34 is positioned to be visible to the first user 18. The first display 34 is electrically coupled to the first processor 26 such that the first display 34 displays operational parameters of the first processor 26. The first display 34 may be an LED display or the like. The operational parameters of the first processor 26 may include indicia relating to the predetermined trigger distance.

A first clock 35 is positioned within the first housing 24 to track a time of day. The first clock 35 is electrically coupled to the first processor 26 and the first clock 35 may be an electronic clock or the like. A plurality of light emitters 36 is provided and each of the light emitters 36 is coupled to the first housing 24 to selectively emit light outwardly from the first housing 24. Each of the light emitters 36 is electrically coupled to the first processor 26 and each of the light emitters 36 may comprise an LED or the like.

A first input port 38 is coupled to the first housing 24 to be selectively electrically coupled to a power source. The first input port 38 is electrically coupled to the first processor 26 and the first input port 38 may be a usb port or the like. Moreover, the power source may be a battery charger or the like. A first power supply 40 is positioned within the first housing 24 and the first power supply 40 is electrically coupled to the first processor 26. The first power supply 40 comprises at least one battery and the first power supply 40 is selectively charged by the first input port 38.

A second tracking unit 42 is provided and the second tracking unit 42 is selectively worn on or carried by the second user 20. The second tracking unit 42 is in electrical communication with the first tracking unit 16. Moreover, the first tracking unit 16 determines a location of the second tracking unit 42 with respect to the first tracking unit 16. In this way the second tracking unit 42 facilitates the first user 18 to track the second user 20. The first tracking unit 16 generates an alert when the second tracking unit 42 moves beyond the predetermined trigger distance with respect to the first tracking unit 16. Thus, the first user 18 is notified when the second user 20 has moved beyond the predetermined trigger distance from the first user 18. The second user 20 may be a child, a disabled adult or other person needing supervision.

The second tracking unit 42 comprises a second band 44 that is selectively worn on the second user 20. A second housing 45 is removably coupled to the second band 44 and a second processor 46 is positioned within the second housing 45. The second housing 45 may be a watch body or the like. A second elastic strap 47 is coupled to the second housing 45. The second elastic strap 47 may be coupled to an object when the second band 44 is not being worn. The object may be the second user's 20 clothing or the like and the second processor 46 may be an electronic processor or the like.

A heart beat sensor 48 is coupled to the second housing 45 to sense a heart beat of the second user 20 when the second user 20 wears the second band 44. The heart beat sensor 48 is electrically coupled to the second processor 46. Moreover, the heart beat sensor 48 may be an electronic heart beat sensor 48 or the like. The first processor 26 generates the alarm 33 sequence when the heart beat sensor 48 does not sense the heart beat of the second user 20. In this way the first user 18 is notified when the second tracking unit 42 has been removed from the second user 20 and when the second user 20 experiences a medical emergency.

A transmitter 50 is positioned within the second housing 45 and the transmitter 50 is electrically coupled to the second processor 46. The transmitter 50 is in electrical communication with the receiver 30. The signal analyzer 32 determines a distance between the transmitter 50 and the receiver 30 based on a signal strength between the transmitter 50 and the receiver 30. The first processor 26 generates the alarm 33 sequence when the signal analyzer 32 determines the transmitter 50 has moved beyond the predetermined trigger distance from the receiver 30. The transmitter 50 may be a radio frequency transmitter 50 or the like.

A second display 52 is coupled to the second housing 45 to be visible to the second user 20. The second display 52 is electrically coupled to the second processor 46 such that the second display 52 displays operational parameters of the second processor 46. The second display 52 may be an LED display or the like. A second clock 54 is positioned within the second housing 45 to track a time of day. The second clock 54 is electrically coupled to the second processor 46 and the second clock 54 may be an electronic clock or the like.

A second input port 56 is coupled to the second housing 45 to be selectively electrically coupled to the power source. The second input port 56 is electrically coupled to the second processor 46. The second input port 56 may be a usb port or the like and the power source may be a battery charger or the like. A second power supply 58 is positioned within the second housing 45 and the second power supply 58 is electrically coupled to the second processor 46. The second power supply 58 comprises at least one battery and the second power supply 58 is selectively charged with the second input port 56.

A plurality of the second tracking units 42 may be provided and each of the second tracking units 42 may be worn on or carried by an associated one of a plurality of second users 20. The transmitter 50 corresponding to each of the plurality of second tracking units 42 may be in electrical communication with the receiver 30. Moreover, each of the light emitters 36 on the first tracking unit 16 may be assigned to an associated one of the plurality of second tracking units 42. Each of the light emitters 36 may be turned on when the associated one of the plurality of second tracking units 42 is in electrical communication with the first tracking unit 16. In this way the first user 18 is informed of a communication status between the plurality of second tracking units 42 and the first tracking unit 16.

In use, the electronic device 12 is synched with the first tracking unit 16 to program the operational parameters of the first tracking unit 16 to include the predetermined trigger distance. The second tracking unit(s) 42 is/are worn on the second user(s) 20 and the first tracking unit 16 is worn on the first user 18 when each of the first user 18 and the second user(s) 20 are in a public area requiring supervision of the second user(s) 20. The processor generates the alarm 33 sequence when the signal analyzer 32 determines the second tracking unit(s) 42 has/have moved beyond the predetermined trigger distance from the first tracking unit 16. In this way the first user 18 is notified of a potential abduction of the second user(s) 20 and if the second user(s) 20 has/have inadvertently left a designated area. Additionally, the processor generates the alarm 33 sequence when the heart beat sensor 48 no longer senses the heartbeat of the second user(s) 20. In this way the first user 18 is notified to respond to a removal of the second tracking unit(s) 42 and a potential medical emergency.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A tracking assembly being configured to track a location of a first user with respect to a second user, said assembly comprising:
   an electronic device having primary transceiver;
   a first tracking unit being configured to be worn on a first user, said first tracking device being in electrical communication with said electronic device, said electronic device programming a predetermined trigger distance into said first tracking unit, said first tracking unit comprising:
      a first band being configured to be worn,
      a first housing being coupled to said first band,
      a first processor being positioned within said first housing, said first processor selectively generating an alarm sequence,
      a first transceiver being positioned within said first housing, said first transceiver being electrically coupled to said first processor, said first transceiver being in electrical communication with said primary transceiver such that said first transceiver receives said predetermined trigger distance from said primary transceiver,
      a receiver being positioned within said first housing, said receiver being electrically coupled to said first processor,
      a signal analyzer being positioned within said first housing, said signal analyzer being electrically coupled to said first processor,
      an alarm being positioned within said first housing wherein said alarm is configured to communicate an alert to the first user, said alarm being electrically coupled to said first processor, said first processor turning said alarm on when said first processor generates said alarm sequence,
      a first display being coupled to said first housing wherein said first display is configured to be visible to the first user, said first display being electrically coupled to said first processor such that said first display displays operational parameters of said first processor,
      a first clock being positioned within said first housing wherein said first clock is configured to track a time of day, said first clock being electrically coupled to said first processor,
      a plurality of light emitters, each of said light emitters being coupled to said first housing wherein each of said light emitters is configured to selectively emit light outwardly from said first housing, each of said light emitters being electrically coupled to said first processor,
      a first input port being coupled to said first housing wherein said first input port is configured to be selectively electrically coupled to an extrinsic device, said first input port being electrically coupled to said first processor, and
      a first power supply being positioned within said first housing, said first power supply being electrically coupled to said first processor, said first power supply comprising at least one battery; and
   a second tracking unit being configured to be worn on a second user, said second tracking unit being in electrical communication with said first tracking unit such that said first tracking unit determines a location of said second tracking unit with respect to said first tracking unit wherein said second tracking unit is configured to facilitate the first user to track the second user, said first tracking unit generating an alert when said second tracking unit moves beyond said predetermined trigger distance with respect to said first tracking unit, said second tracking unit comprising:
      a second band being configured to be worn,
      a second housing being coupled to said second band,
      a second processor being positioned within said second housing,
      a heart beat sensor being coupled to said second housing wherein said heart beat sensor is configured to sense a heart beat of the second user when the second user wears said second band, said heart beat sensor being electrically coupled to said second processor, said first processor generating said alarm sequence when said heart beat sensor does not sense the heart beat of the second user,
      a transmitter being positioned within said second housing, said transmitter being electrically coupled to said second processor, said transmitter being in electrical communication with said receiver, said signal analyzer determining a distance between said transmitter and said receiver based on a signal strength between said transmitter and said receiver, said first processor generating said alarm sequence when said signal analyzer determines said transmitter has moved beyond said predetermined trigger distance from said receiver, a second display being coupled to said second housing wherein said second display is configured to be visible to the second user, said second display being electrically coupled to said second processor such that said second display displays operational parameters of said second processor, a second clock being positioned within said second housing wherein said second clock is configured to track a time of day, said second clock being electrically coupled to said second processor, a second input port being coupled to said second housing wherein said second input port is configured to be selectively electrically coupled to an extrinsic device, said second input port being electrically coupled to said second processor, and a second power supply being positioned within said second housing, said second power supply being electrically coupled to said second processor, said second power supply comprising at least one battery.

* * * * *